United States Patent [19]
Unland et al.

[11] Patent Number: 6,012,425
[45] Date of Patent: Jan. 11, 2000

[54] DEVICE FOR DETECTING KNOCKING AND REGULATION OF AN INTERNAL COMBUSTION ENGINE

[75] Inventors: Stefan Unland; Oskar Torno, both of Schwieberdingen, Germany; Robert Sloboda, Yokohama, Japan; Werner Haeming, Neudenau, Germany; Iwan Surjadi, Vaihingen, Germany; Michael Baeuerle, Markgroeningen, Germany; Sigfrid Hafner, Stuttgart, Germany

[73] Assignee: Robert Bosch GmbH, Stuttgart, Germany

[21] Appl. No.: 08/973,389

[22] PCT Filed: Mar. 26, 1997

[86] PCT No.: PCT/DE97/00610

§ 371 Date: Nov. 18, 1997

§ 102(e) Date: Nov. 18, 1997

[87] PCT Pub. No.: WO97/40356

PCT Pub. Date: Oct. 30, 1997

[30] Foreign Application Priority Data

Apr. 19, 1996 [DE] Germany .................. 196 15 448

[51] Int. Cl.[7] ................... G01L 23/22; F02P 5/14
[52] U.S. Cl. ................... 123/406.38; 73/35.04; 701/111
[58] Field of Search ............ 123/406.21, 406.38, 123/406.39, 435; 73/35.04, 35.05; 701/111

[56] References Cited

U.S. PATENT DOCUMENTS

| | | |
|---|---|---|
| 4,593,553 | 6/1986 | Bonitz et al. ............ 73/35.04 |
| 4,899,710 | 2/1990 | Takahashi ............ 123/435 X |
| 4,936,277 | 6/1990 | Deutsch et al. ............ 123/436 |
| 5,373,448 | 12/1994 | Katogi et al. ............ 123/435 X |
| 5,460,031 | 10/1995 | Fujishita et al. ............ 123/406.38 |
| 5,483,936 | 1/1996 | Kerstein et al. ............ 701/111 X |
| 5,531,201 | 7/1996 | Boverie et al. ............ 701/111 X |
| 5,560,337 | 10/1996 | Bolander et al. ............ 701/111 X |
| 5,806,013 | 9/1998 | Paielli ............ 701/106 |

FOREIGN PATENT DOCUMENTS 44 21 950  6/1995  Germany .

*Primary Examiner*—Tony M. Argenbright
*Attorney, Agent, or Firm*—Michael J. Striker

[57] ABSTRACT

A device for detecting knocking and regulating an internal combustion engine has at least one knocking sensor adapted to be assigned to a cylinder of the internal combustion engine and delivers an electrical output signal which is a function of a combustion stage in a respective cylinder. A signal evaluation unit receives the electrical output signal and has at least one preprocessing stage, a logical evaluation device formed as a device selected from a fuzzy logic device and at least one neuronic network, and a microprocessor making a connection within the signal evaluation unit. The preprocessing stage includes an element for extracting characteristic features from the output signal of the knocking sensor so that individual values are selected from an output signal of the signal preprocessing stage to form at least one signal vector which is fed to the neuronic network as an input vector which forms decision criteria making possible a statement regarding a presence of knocking.

14 Claims, 3 Drawing Sheets

DEVICE FOR DETECTING KNOCKING AND REGULATION OF AN INTERNAL COMBUSTION ENGINE

BACKGROUND OF THE INVENTION

The invention relates to a device for detecting knocking and for regulating an internal combustion engine.

So that an internal combustion engine can be optimally regulated, it is necessary to dependably detect so-called "knocking", which represents a critical operational state which can have a disadvantageous effect on the service life of the internal combustion engine. If knocking is detected, the ignition angle is normally adjusted, so that it is assured that knocking will be prevented during the following ignition processes.

In known devices for the detection of knocking, the sounds generated in the internal combustion engine are registered with the aid of so-called structure-borne noise sensors. The output signals from the sensors are processed and analyzed with the aid of a microprocessor.

A device for detecting knocking, operating in accordance with this method is known, for example, from DE-OS 44 21 950. With this known device the output signals are first preprocessed and then further processed with the aid of a neuronic network as well as a connected fuzzy logic device. If knocking is detected, ignition or fuel injection is affected in the customary manner in such a way that conditions are reestablished under which no knocks occur.

Although a signal preprocessing stage is provided by the device for detecting knocking known from DE-OS 44 21 950, which matches the provided by the knocking sensors to the adjoining neuronic network as well as the fuzzy logic, no information can be found as to how the signal preprocessing stage is to be designed.

SUMMARY OF THE INVENTION

Accordingly, it is an object of present invention to provide a device for detecting knocking and regulating an internal combustion engine which avoids disadvantages of the prior art. In keeping with these objects, one feature of present invention resides, briefly stated in the device in which a preprocessing stage has means which extract characteristic features from an output signal of a knocking sensor that individual values are selected from the output signal of the signal preprocessing stage, that a signal vector is formed or signal vectors are formed in this way, and it or they are fed to a neuronic network as the input vector which forms precision criteria from this, which makes possible a statement regarding the presence of knocking.

When the device is designed in accordance with the present invention it has the advantage, that the output signals from the knocking sensors are processed prior to being supplied to the neuronic network in such a way, that an especially dependable further processing can take place. These advantages are achieved in that several characteristic values of the knocking sensor signal are already extracted in the signal preprocessing unit, and only these selected signals are supplied to a logical evaluation device which, for example, is constructed by means of neuronic networks or as a fuzzy logic device.

It is particularly advantageous here to scan the characteristic features in the signal preprocessing unit only in the course of a measuring window, so that the location of the knocking can be determined and interferences screened out. It is furthermore advantageous to perform a Fourier transformation in the signal preprocessing device and to determine one or several knock advance frequencies and to supply this information to the neuronic network as a characteristic feature. In an advantageous manner it is also possible to provide an integration of the total energy in the measuring window, so that the knocking energy can be supplied to the neuronic network as a characteristic feature. It can also be advantageous to detect partial energies in different measuring windows in the signal preprocessing unit and to employ the characteristic signal shape obtained in this way for differentiating between interference noises and knocking.

In an advantageous manner the evaluation and classification of the characteristics extracted in the preprocessing stage takes place by means of a neuronic network, wherein the number of the characteristics corresponds to the number of the input neurons. The output values, which permit a statement regarding the knock intensity, are calculated in the neuronic network. A threshold is determined as a function of the calculated knock intensities, after which the ignition angle is adjusted in the direction toward a delay as a knock-preventing step.

The invention is not limited to the use of neuronic networks, but can also be expanded in an advantageous manner to other networks.

BRIEF DESCRIPTION OF THE DRAWINGS

Exemplary embodiments of the invention are represented in the drawings and will be explained in detail in the following description.

DESCRIPTION OF PREFERRED EMBODIMENTS

Figure 1:
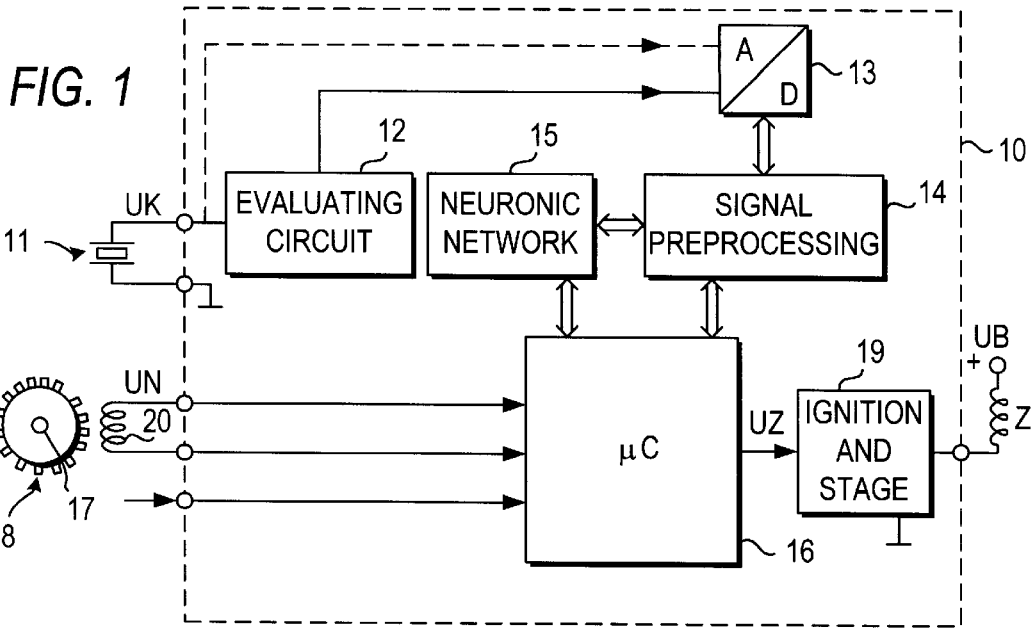
In FIG. 1 the essential components of a device for detecting knocking and regulating an internal combustion engine are represented in detail. Methods are disclosed in FIGS. 2, 3 and 4 which show how the appearance of knocks is detected by means of the output signals of the knocking sensor or knocking sensors.

The components which are important for the invention of a device for detecting knocking and regulation of an internal combustion engine are represented in FIG. 1. In this case, 10 identifies a signal evaluation unit, for example the control device of the internal combustion engine, a knocking sensor which is associated with a cylinder of the internal combustion engine is identified by 11. Further knocking sensors are assigned in the customary manner to the remaining cylinders which, however, for the sake of simplicity are not represented in FIG. 1.

The knocking sensor 11 provides an output signal identified by UK. This is supplied to the control device 10, but it is first processed in an evaluation circuit 12 in such a way, that it can subsequently be supplied to an analog/digital converter 13. The analog/digital converter 13 is connected with a signal preprocessing stage 14, in which preprocessing of the data supplied by the analog/digital converter 13 takes place.

The signal preprocessing stage 14 is connected with a neuronic network and a microprocessor 16, in which the entire regulation of the device for detecting knocking as well as the regulation of the internal combustion engine is performed. Further signals are provided to the microprocessor 16 to this end. For example, these further signals are the so-called load L of the combustion engine and the rpm n. In this case the rpm are customarily detected in that a sensor 20 scans a gear wheel 18 connected with the crankshaft 17 of the internal combustion engine. The sensor 20 in this case usually is an inductive sensor, in which voltage pulses UN are generated in the course of the passage of the individual teeth of the gear wheel 18, from the chronological sequence of which the rpm n can be determined. It is of course possible to provide further signals for evaluation to the control device 10 or to the microcomputer of the control device. The actuating signals required for the regulation of the internal combustion engine are calculated by the microprocessor as a function of the supplied signals. For example, actuating signals UZ are made available for the ignition end stage 19. A voltage formed from the battery voltage UB is supplied to the ignition coils Z as a function of the actuation signals.

The arrangement in accordance with FIG. 1 is considered to be by way of example and can be complemented by different components. For example, a multiplexer can be provided, through which the signals generated by various knocking sensors 11 can be supplied to the control device. The signal processing stage 12 can be omitted as long as it is assured that the output signal of the knocking sensor 11 or the output signals of the various knocking sensors already have values which permit a dependable analog/digital conversion. In this case the output signals UK would be directly supplied to the analog/digital converter 13.

In principle, the device presented in FIG. 1 is not limited to the evaluation of knocking sensor signals, instead signals from other sensors can also be evaluated in connection with a regulating system. It is then necessary to appropriately adapt signal preprocessing in the preprocessing stage 14, so that characteristic values are also again extracted and then supplied to the neuronic network 15 or another network.

Figure 2:
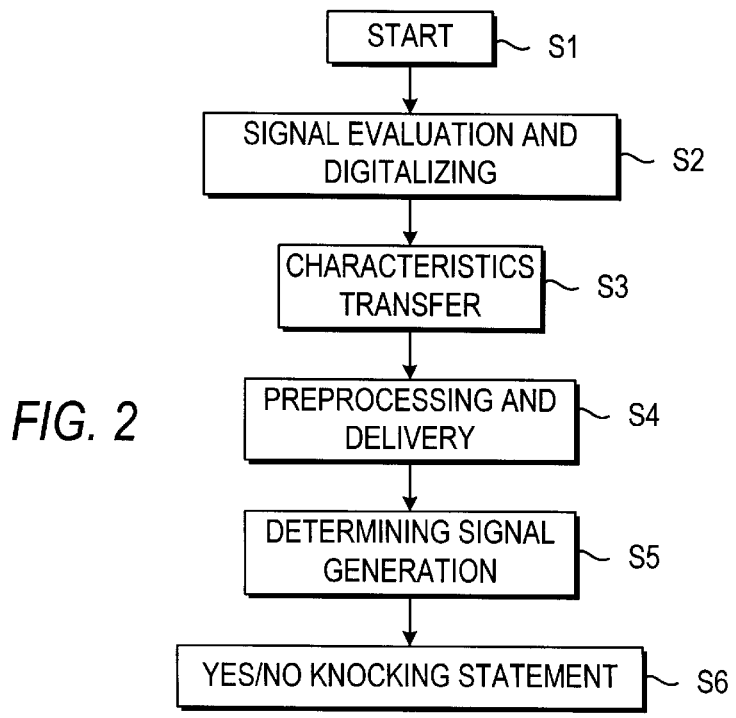
Figure 3:
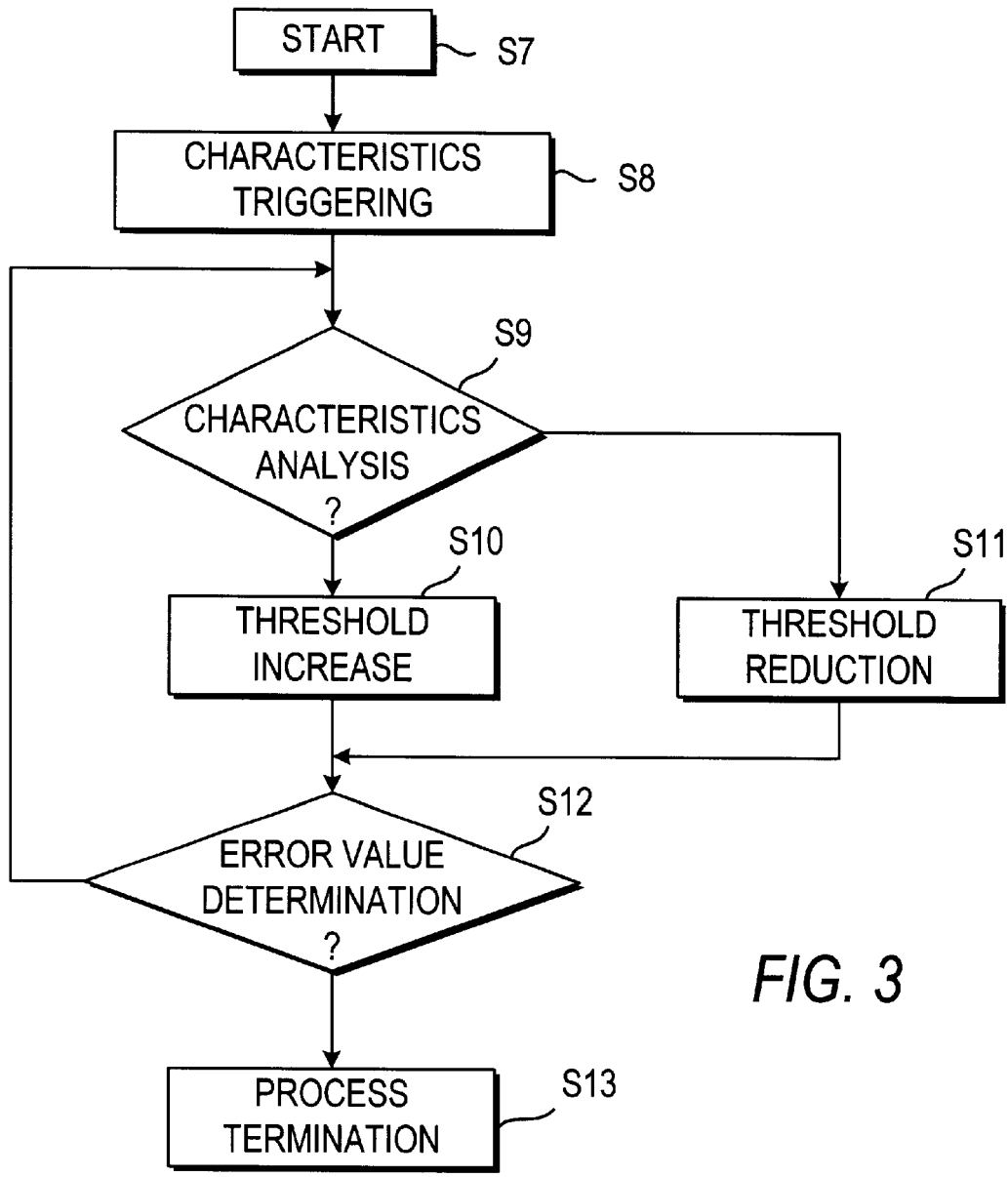
Figure 4:
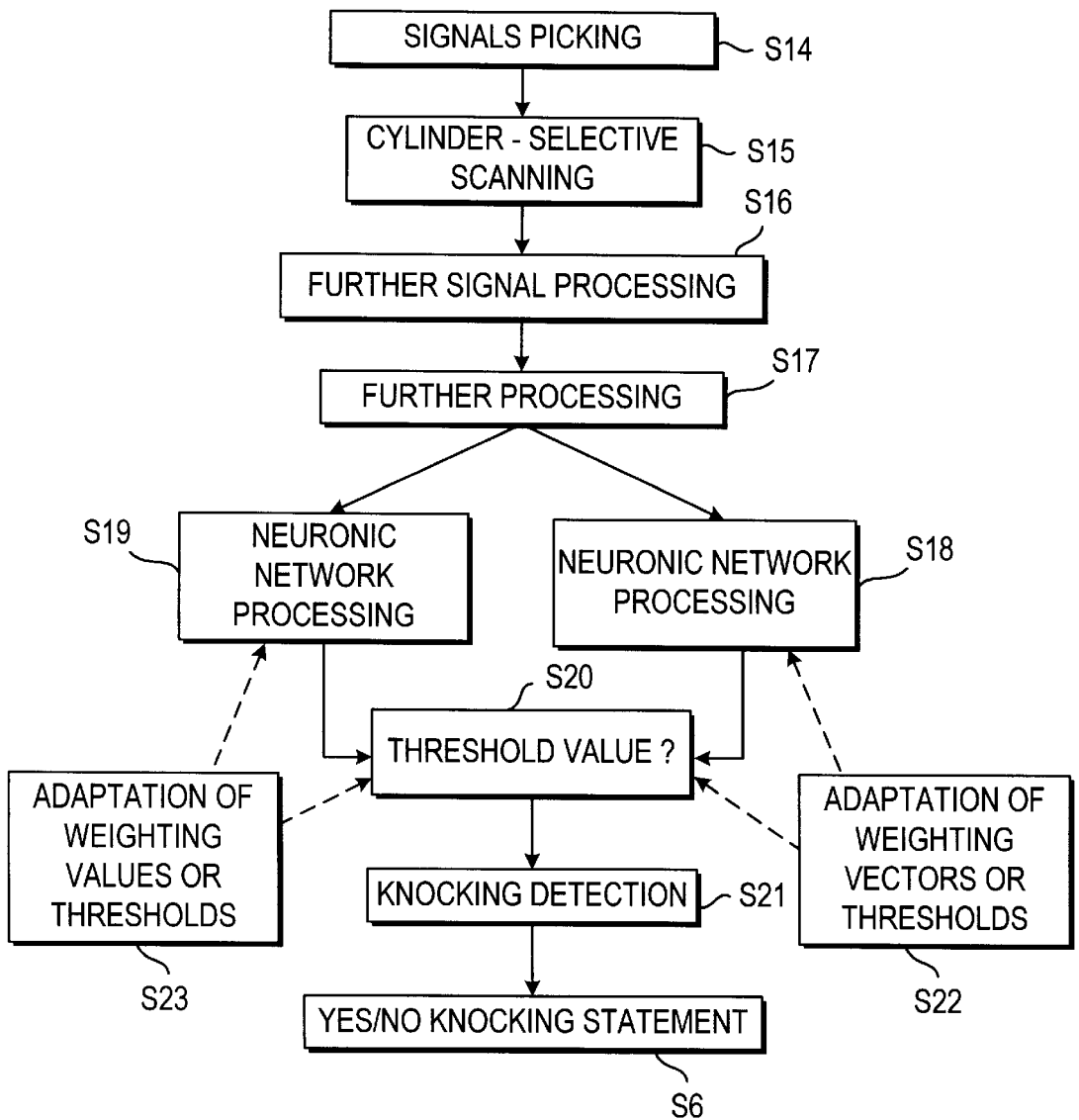

The methods for detecting knocking or for regulation of an internal combustion engine represented in FIGS. 2, 3 and 4 are performed in the device shown in FIG. 1. A first overview of the signal evaluation is represented in FIG. 2, wherein initially the knocking sensor signal is evaluated in a suitable manner, is digitized by an analog/digital converter and supplied to the actual preprocessing stage 14. This is indicated in FIG. 2 by the step S1.

The digitized knocking sensor signal is further processed in the preprocessing stage 14. In this process, selectable characteristic values of the knocking sensor signal are extracted. These characteristic features can be obtained, for example, by scanning within a measuring window, in this case the location of the knock event can be fixed. It is furthermore possible to screen out interferences. If subsequently a Fourier transformation of the digitized signal is performed, one knocking advance frequency or several knocking advance frequencies can be detected. For example, the knocking energy can be determined by an integration of the total energy of the knocking sensor signal in a selectable measuring window. It is also possible to detect partial energies of the knocking sensor signal by performing the calculation of the partial energies in different measuring window sections. A characteristic signal shape can be obtained by localizing different measuring windows or different measuring window sections. A differentiation between interference noises and noises caused by knocking can be made by means of this. The formation of measuring windows or the exclusive forwarding of the signal during selectable phases can take place in the preprocessing stage 14.

The above described extraction of characteristic features from the knocking sensor signal is performed in the signal preprocessing stage 14. The process or processes which take place in the signal evaluation stage 14 are identified as step S2 in FIG. 2. The selection and classification of the characteristics extracted in the signal preprocessing stage 14 is performed automatically with the aid of a neuronic network. In this case the extracted characteristics are fed to an input layer, which is a part of the neuronic network. The neuronic network is identified by 15 in FIG. 1, and is, for example, a separate neuronic computer. However, the neuronic network can also be a component of the microprocessor 16, which is provided anyway.

In a general way the neuronic network can be considered to be a logical evaluation device. It is also possible to employ a fuzzy logic device or a combined network in place of one or several neuronic networks.

In the method disclosed in FIG. 2, the transfer of the extracted characteristics into the input layer of the neuronic network is shown as step S3. The actual processing and delivery in the neuronic network is identified as step S4. A signal, which makes it possible to determine whether there is knocking or not, is generated at the output of the neuronic network or in the output layer. This signal is generated in step S5. The statement "knocking yes/no" is fed to the microprocessor 16 which calculates new actuation signals for the ignition UZ based on this information, as well as on additional information with which it has been provided. If it has been determined at the output of the neuronic network 15 that there is knocking, this is taken into consideration when calculating the new ignition signal UZ, and the microprocessor 16 issues signals which adjust the ignition angle in the direction toward a delay.

Therefore the evaluation and classification of the characteristics extracted in the signal preprocessing stage takes place in the neuronic network 15 itself. In this case the number of characteristics to be evaluated corresponds to the number of inputs at a neuron of the neuronic network. The output values calculated in the neuronic network permit an evaluation of the knocking intensity. It is possible, for example, to determine a threshold as a function of these knocking intensities, from which the ignition angle is adjusted in the direction toward a delay as a knock-preventing measure. The microprocessor 16 in the end determines whether an ignition angle adjustment is required.

An exemplary embodiment of a neuronic network is represented in FIG. 3. The progress diagram in FIG. 3 corresponds to the block identified as the neuronic network 15 in FIG. 1. A similar neuronic network is known from EP-0 441 522 A. Following the start S7, the progress diagram of a neuronic network represented in FIG. S3 triggers an input of the characteristics S8. These characteristics, which are entered into the neuronic network, correspond to the characteristics extracted in the preprocessing stage 14. Therefore the entered characteristics are already characteristic features of the knocking sensor signal and not the output signal of the knocking sensor itself. These extracted characteristics are analyzed in step S9. In the process, a check is performed whether the values of the output layer are the same as the entered values (knocking or no knocking). If this is the case, an increase of the threshold or of the weighting factors is performed. If step S9 discloses that the values of the output layer do not correspond to the entered values, a reduction of the threshold or of the weighting factor is performed in step S11.

Finally, in step S12, the results of steps S10 and s11 are checked to determine whether an error which has occurred is minimal. If this is the case, the process is terminated in step S13. If, however, it is determined in step S12 that the error is not minimal, the program again continues with step S9. It is therefore possible by means of the exemplary embodiment of a neuronic network represented in FIG. 3 to learn and adapt threshold values or weighting factors, so that an optimal knocking detection becomes possible.

A further exemplary embodiment of the invention is represented in FIG. 4, wherein signal preprocessing as well as further processing in the neuronic network is explained in more detail. In connection with the exemplary embodiment of FIG. 4, the structure-borne noise signals or the output signals of the knocking sensors are picked up in detail in step S14. Cylinder-selective scanning takes place in step S15. This cylinder-selective scanning can take place, for example, with the aid of the analog/digital converter 13, but it is also possible to provide several analog/digital converters, or scanning is performed in a sort of multiplex operation.

In the signal preprocessing stage 14, the cylinder-selectively scanned signals are subjected to a Fast Fourier transformation, or are further processed with the aid of several digital filters (step S16). Both the Fast Fourier transformation and the employment of several digital filters is already known in connection with the evaluation of knocking sensor signals. For example, from the publications DE-OS 35 06 114 or DE-OS 31 37 016. Therefore the exact procedure in connection with the Fast Fourier transformation or with the signal evaluation with the aid of one or several digital filters will not be explained in detail here.

The signals processed in step S16 are further processed in step S17, wherein individual values are selected. These selected values which, for example, only include a partial amount of the Fourier transformation, are combined in a so-called signal vector. This signal vector is further processed with the aid of a neuronic network. Since alternative solutions are possible for this further processing, strictly one neuronic network is provided for each one of these solutions. Other network structures can also be employed in place of one or several neuronic networks, these are identified in general as perceptrons.

From what or how the signal vectors are composed, depends on what methods have been selected in the signal preprocessing stage 14. If the extraction of values is performed by means of a cylinder-selective scanning within a measuring window, the signal vectors contain information regarding the location of the knocking event, wherein interferences can be screened out to a large extent. If, following the cylinder-selective scanning within a measuring window, a Fourier transformation is also performed, the signal vector contains information regarding several knocking advance frequencies. If an integration of the total energy of the knocking sensor signals in the measuring window is performed, the knocking energy is obtained and the associated signal vector is therefore a function of the knocking energy. Characteristic signal shapes can be recognized by calculating the partial energies in different measuring window sections, a differentiation of the interference noise from knocking is possible, this is also successful by means of the employment of several digital filters in the signal preprocessing stage 14. In these cases the signal vector obtained from the selected values will be a function of the characteristic signal shape or of the differentiation between interference noise and knocking.

Therefore two different methods are offered for evaluating the signal vectors with the aid of networks, for example neuronic networks, which are identified as steps S18 or S19. In accordance with the first option identified a step S18, the signal vector is compared with one or several weighting vectors. Then a weighting vector is selected which has the shortest distance from the signal distance. This shortest distance is then used as a comparison value for the threshold value. The threshold value comparison which follows as step S20 then has the knocking detection as its result in step S21. In the flow diagram of FIG. 4 the detection of knocking yes/no is identified as step 21. If knocking is detected, the microprocessor 16 is informed of this which, when knocking has been detected, triggers an ignition adjustment in the direction of a delay by means of issuing appropriate actuating signals UZ to the ignition end stage, by means of which it is assured that no knocking will occur during subsequent ignitions.

A second option of signal processing by means of neuronic networks is represented in step S19. With this option the signal vector is standardized to 1 and multiplied by a weighting vector. The value resulting from this is the comparison value for the threshold value. The threshold comparison again takes place in the subsequent step S20. The comparison between the threshold value and the calculated value again makes possible the knocking detection.

With both options, the weighting vectors or threshold values can be adapted during operation. The threshold values are determined prior to the first time the knocking detection device is used, or prior to each time it is used. The adaptation of the weighting vector or of the weighting vectors or of the threshold values is identified by S22 or S23.

A dependable knocking detection becomes possible by means of proceeding in accordance with the invention, in accordance with which predeterminable characteristics are extracted from the knocking sensor signal in a preprocessing step 14, and only these characteristics are supplied to the neuronic network 15, for example as signal vectors. Since a portion of possibly occurring error sources or signal interferences are already removed by the formation of measuring windows, it is assured that a particularly dependable and error-resistant knocking detection is possible. A lesser effort is required for processing in the neuronic network 15, provided that an extensive preparation or selection has already taken place in the signal preprocessing stage 14.

We claim:

1. A device for detecting knocking and regulating an internal combustion engine, comprising at least one knocking sensor adapted to be assigned to a cylinder of the internal combustion engine and levering an electrical output signal which is a function of a combustion stage in a respective cylinder; a signal evaluation unit which receives the electrical output signal and has at least one preprocessing stage, a logical evaluation device formed as a device selected from the group consisting of a fuzzy logic device and at least one neuronic network, and a microprocessor making a connection within said signal evaluation unit, said preprocessing stage comprising means for extracting characteristic features from the output signal of the knocking sensor so that individual values are selected from an output signal of said signal preprocessing stage to form at least one signal vector which is fed to said neuronic network as an input vector which forms decision criteria making possible a statement regarding a presence of knocking.

2. A device as defined in claim 1; wherein said means select the individual values selected from the output signal of said signal preprocessing stage so that a plurality of signal vectors are formed and fed to said neuronic network.

3. A device as defined in claim 2; and further comprising an additional knocking sensor arranged so that the electric output signals of said knocking sensors are fed to said signal evaluating unit.

4. A device as defined in claim 1; and further comprising an additional separate knocking sensor associated with each cylinder, so that the electrical output signals of the knocking sensors are fed to said signal evaluating unit.

5. A device as defined in claim 1; wherein said signal evaluating unit is a component of a control device of the internal combustion engine, said microcomputer being operative for issuing actuating signals for an ignition end stage as a function of output signals of said neuronic network.

6. A device as defined in claim 5; wherein said microprocessor is formed so that when knocking has been detected, the actuating signals for the ignition end stage cause a displacement of an ignition angle in direction toward a delay.

7. A device as defined in claim 1; wherein said means of said signal preprocessing stage which extract characteristic features from the output signal of said knocking signal are computing means which perform a Fast Fourier transformation.

8. A device as defined in claim 1; wherein said preprocessing stage includes means correspond to at least one digital filter and processing the electrical output signals of said knocking sensor so that only characteristic signal shapes are passed on to said neuronic network.

9. A device as defined in claim 1; wherein said preprocessing stage includes means for performing integration of a total energy of said electrical output signal of said knocking sensor in a measuring window for determining a knocking energy.

10. A device as defined in claim 1; and further comprising at least one analog/digital convertor provided between said knocking sensor and said signal processing stage.

11. A device as defined in claim 1; and further comprising a digital filter performing a cylinder-selective scanning of said electrical output signal of said knocking sensor.

12. A device as defined in claim 1; wherein said neuronic network is operative for performing a distance calculation between a signal vector and several weighting vectors, and a selection of a weighting vector takes place with a shortest distance so that based on this, for knocking detection a manipulated variable comparison is performed.

13. A device as defined in claim 12; and further comprising means for multiplying the signal vector by a weighting vector, and comparing a result with a threshold value for knocking detection.

14. A device as defined in claim 13; and further comprising means for continuously adapting at least one of said weighting vector and said threshold value while taking into consideration previous measuring results.

* * * * *